United States Patent
Eloul et al.

(10) Patent No.: US 12,182,547 B2
(45) Date of Patent: Dec. 31, 2024

(54) SYSTEMS AND METHODS FOR CODE REPOSITORY EMBEDDING FOR TAGGING AND SUMMARIZATION TASKS USING ATTENTION ON MULTIPLE CODE DOMAINS

(71) Applicant: JPMORGAN CHASE BANK, N.A., New York, NY (US)

(72) Inventors: Shaltiel Eloul, London (GB); Agathe Lhérondelle, Sotteville-les-Rouen (FR); Sean Moran, Putney (GB); Fanny Silavong, London (GB); Yash Satsangi, Tilburg (NL)

(73) Assignee: JPMORGAN CHASE BANK, N.A., New York, NY (US)

( * ) Notice: Subject to any disclaimer, the term of this patent is extended or adjusted under 35 U.S.C. 154(b) by 198 days.

(21) Appl. No.: 17/821,643

(22) Filed: Aug. 23, 2022

(65) Prior Publication Data
US 2023/0062297 A1    Mar. 2, 2023

Related U.S. Application Data

(60) Provisional application No. 63/236,488, filed on Aug. 24, 2021.

(51) Int. Cl.
*G06F 8/36* (2018.01)
*G06N 3/04* (2023.01)

(52) U.S. Cl.
CPC ...... *G06F 8/36* (2013.01); *G06N 3/04* (2013.01)

(58) Field of Classification Search
CPC ... G06F 8/33; G06F 8/36; G06F 8/311; G06N 3/04
See application file for complete search history.

(56) References Cited

U.S. PATENT DOCUMENTS

| | | | |
|---|---|---|---|
| 2013/0174124 A1* | 7/2013 | Watters | G06F 8/71 717/122 |
| 2014/0223416 A1* | 8/2014 | Cohen | G06F 11/3452 717/123 |

(Continued)

OTHER PUBLICATIONS

David Azcona et al., "user2code2vec: Embeddings for Profiling Students Based on Distributional Representation of Source Code," ACM, 2019, pp. 86-95. Retrieved from the Internet: <URL: https://dl.acm.org/doi/pdf/10.1145/3303772.3303813>. (Year: 2019).*

(Continued)

*Primary Examiner* — Hanh Thi-Minh Bui
(74) *Attorney, Agent, or Firm* — GREENBERG TRAURIG LLP

(57) ABSTRACT

Systems and methods for code repository embedding using attention mechanism for tagging and summarization are disclosed. According to one embodiment, a method for code repository embedding may include: (1) extracting, by a computer program executed by an electronic device, docstring embeddings, code embeddings, and dependency embeddings from scripts in a repository (2) applying, by the computer program, a machine learning algorithm to each of the docstring embeddings, code embeddings, and dependency embeddings; (3) concatenating, by the computer program, outputs of the machine learning algorithm; (4) weighting, by the computer program, the concatenated outputs of the machine learning algorithm using an attention mechanism, resulting in a repository representation comprising an abstract vector; and (5) tagging or summarizing, by the computer program, the script using its repository representation.

11 Claims, 3 Drawing Sheets

(56) References Cited

U.S. PATENT DOCUMENTS

2020/0250309 A1* 8/2020 Harang .................. G06F 18/21
2021/0357187 A1* 11/2021 Clement .................. G06F 8/35
2022/0398272 A1* 12/2022 Sastry .................... G06F 16/86

OTHER PUBLICATIONS

Lei Chai and Ming Li, "Pyramid Attention For Source Code Summarization," 36th Conference on Neural Information Processing Systems (NeurIPS 2022), pp. 1-13. Retrieved from the Internet: <URL: https://proceedings.neurips.cc/paper_files/paper/2022/file/803cb038c7df56122e55a06c2856938f-Paper-Conference.>. (Year: 2022).*

* cited by examiner

SYSTEMS AND METHODS FOR CODE REPOSITORY EMBEDDING FOR TAGGING AND SUMMARIZATION TASKS USING ATTENTION ON MULTIPLE CODE DOMAINS

RELATED APPLICATIONS

This application claims priority to, and the benefit of, U.S. Provisional Patent Application Ser. No. 63/236,488, filed Aug. 24, 2021, the disclosure of which is hereby incorporated, by reference, in its entirety.

BACKGROUND OF THE INVENTION

1. Field of the Invention

Embodiments generally relate to systems and methods for code repository embedding for tagging and summarization using attention on multiple domains.

2. Description of the Related Art

Open source software communities have grown extensively in the recent years. Codebases such as GitHub provide developers a collaborative environment to search for relevant code, follow advancement of technology, learn, and initialize ideas for new applications. With large content available publicly, tagging and topic modelling of code repositories plays a crucial part in maintaining and efficiently accessing the information in these code repositories. Due to the large number of publicly available code repositories, navigating to a relevant repository can be challenging. Many repositories remain hidden due to a different level of documentation or lack of tags, or simply because a relevant task can be served by only a minor part of the repository. Additionally, for maintaining collaborative codebases and understanding the relationships between various repositories and tasks, it is required to analyze the whole database of repositories to detect duplication of code/tasks, trends of software, collaborative opportunities, or even to extract useful executions from scripts.

SUMMARY OF THE INVENTION

Systems and methods for code repository embedding using attention mechanism for tagging and summarization are disclosed. According to one embodiment, a method for code repository embedding may include: (1) extracting, by a computer program executed by an electronic device, docstring embeddings, code embeddings, and dependency embeddings from scripts in a repository; (2) applying, by the computer program, a machine learning algorithm to each of the docstring embeddings, code embeddings, and dependency embeddings; (3) concatenating, by the computer program, outputs of the machine learning algorithm; (4) weighting, by the computer program, the concatenated outputs of the machine learning algorithm using an attention mechanism, resulting in a repository representation comprising an abstract vector; and (5) tagging or summarizing, by the computer program, the script using its repository representation.

In one embodiment, the method may further include identifying, by the computer program, the script in a code repositories database.

In one embodiment, the computer program may identify the docstring embeddings, code embeddings, and dependency embeddings using an encoder. The encoder may be a Bi-directional Encoder Representations from Transformers.

In one embodiment, the machine learning algorithm may include a gated recurrent unit (GRU) that is part of a Recurrent Neural Network (RNN).

In one embodiment, the attention weights may be trained from a curated dataset collected from a labelled dataset.

In one embodiment, the repository representation may include a numerical representation of the repository.

According to another embodiment, a system may include an electronic device executing a computer program, a code repositories database comprising a plurality of scripts, and a downstream system. The computer program may extract docstring embeddings, code embeddings, and dependency embeddings from scripts in the code repositories database, may apply a machine learning algorithm to each of the docstring embeddings, code embeddings, and dependency embeddings, may concatenate outputs of the machine learning algorithm, and may weight the concatenated outputs of the machine learning algorithm using an attention mechanism, resulting in a repository representation comprising an abstract vector. The downstream system may tag or summarize the script using its repository representation.

In one embodiment, the computer program may crawl the code repositories database and identifies the script.

In one embodiment, the computer program may identify the docstring embeddings, code embeddings, and dependency embeddings using an encoder. The encoder may include a Bi-directional Encoder Representations from Transformers.

In one embodiment, the machine learning algorithm may include a gated recurrent unit (GRU) that is part of a Recurrent Neural Network (RNN).

In one embodiment, the system may also include a database comprising a curated dataset of labelled data, wherein the attention weights may be trained using the curated dataset collected from a labelled dataset.

In one embodiment, the repository representation may include a numerical representation of the repository.

According to another embodiment, a non-transitory computer readable storage medium, including instructions stored thereon, which when read and executed by one or more computer processors, cause the one or more computer processors to perform steps that may include extracting docstring embeddings, code embeddings, and dependency embeddings from scripts in a repository; applying a machine learning algorithm to each of the docstring embeddings, code embeddings, and dependency embeddings; concatenating outputs of the machine learning algorithm; weighting the concatenated outputs of the machine learning algorithm using an attention mechanism, resulting in a repository representation comprising an abstract vector; and tagging or summarizing the script using its repository representation.

In one embodiment, the non-transitory computer readable storage medium may also cause the one or more computer processors to identify the script in a code repositories database.

In one embodiment, the docstring embeddings, code embeddings, and dependency embeddings may be identified using an encoder.

In one embodiment, the machine learning algorithm may include a gated recurrent unit (GRU) that is part of a Recurrent Neural Network (RNN).

In one embodiment, the attention weights may be trained from a curated dataset collected from a labelled dataset.

In one embodiment, the repository representation may include a numerical representation of the repository.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are directed to systems and methods for code repository embedding for tagging and summarization using attention on multiple code domains.

Figure 1:
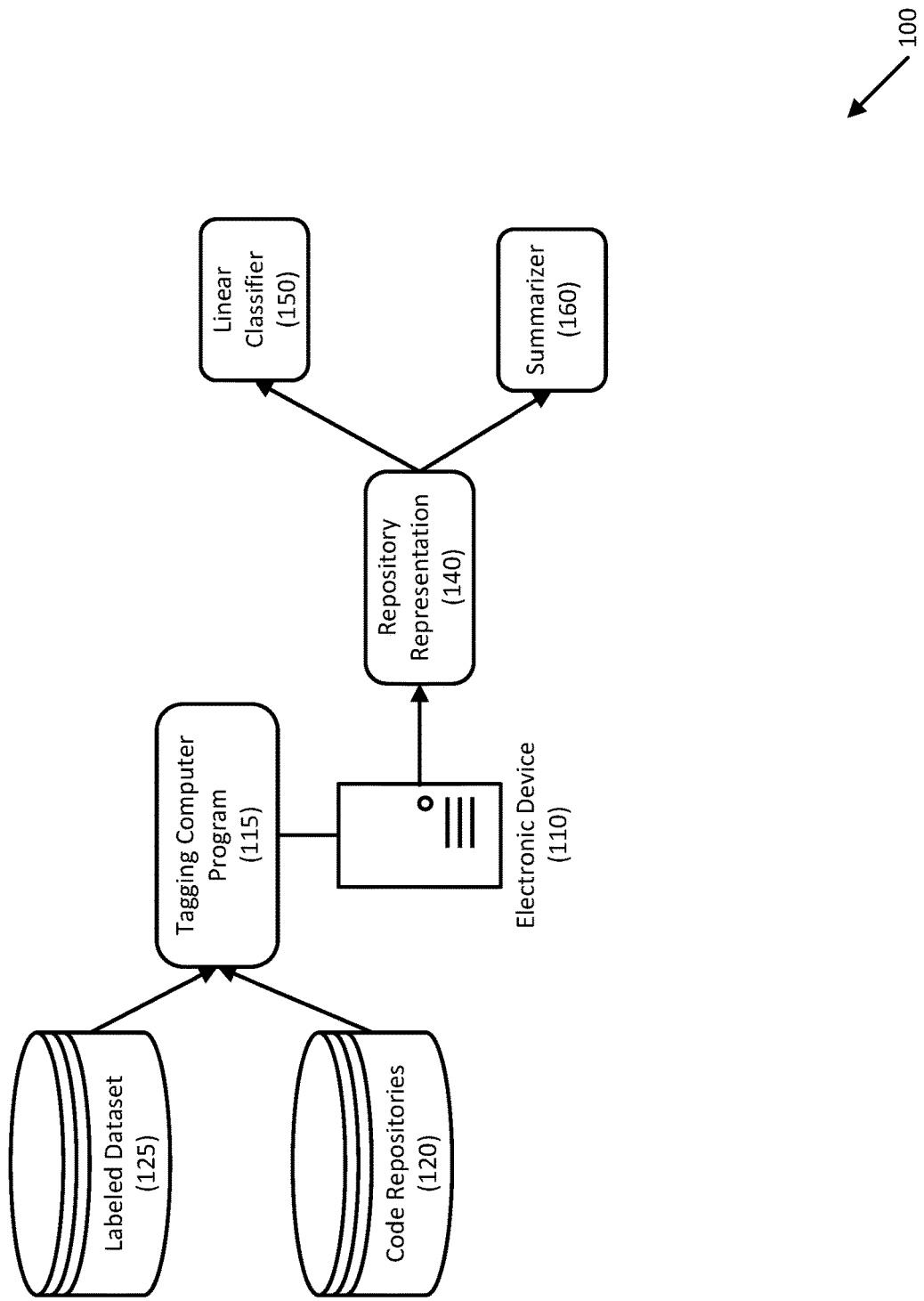
FIG. 1 depicts a system for code repository embedding for tagging and summarization using attention on multiple code domains according to an embodiment.

Referring to FIG. 1, a system for code repository embedding for tagging and summarization using attention on multiple code domains is disclosed according to embodiments. System 100 may include electronic device 110, which may be any suitable electronic device, including servers (e.g., physical and/or cloud-based), computers (e.g., workstations, desktops, notebooks, laptops, tablets, etc.), smart devices, Internet of Things appliances, etc. Electronic device 110 may execute tagging computer program 115, which may interface with code repositories database 120.

Code repositories database 120 may include one or more code repositories that may store code scripts, codes snippets, and docstrings by the developers. An example of a code repositories database is GitHub.

Tagging computer program 115 may crawl code in code repositories database 120, and for the scripts in each repository, may generate docstring embeddings, code embeddings, and dependency (e.g., a connection flow between functions or classes in scripts) embeddings using standard or non-standard encoders. Example of encoders that may be used to generate the embeddings may include the Bi-directional Encoder Representations from Transformers (BERT).

Tagging computer program 115 may then apply one or more machine learning neural network units, such as a gated recurrent unit (GRU) as part of a Recurrent Neural Network (RNN), to the embeddings, resulting in one or more repository representation 140.

In one embodiment, the docstring embeddings, code embeddings and/or dependency embeddings may be concatenated, and an attention mechanism may apply attention weights to the concatenation. In one embodiment, to train attention weights (e.g., weights of the neural network architecture), tagging computer program 115 may crawl labeled dataset 125 to collect a curated dataset. Labeled dataset 125 may contain tags or captions provided ty a developer.

In one embodiment, the attention weights may be trained on the curated dataset crawler using an optimization method such as stochastic gradient descent to predict tags associated with a code repository in code repositories database 120.

The attention weights may be used in various machine learning processes, such as by linear classifier 150 for tagging, by summarizer 160 for text summarization, etc. The embedding output may be adjusted using any dimensionality reduction method such as principal component analysis (PCA) or canonical correlation analysis (CCA) before adding the unit for the machine learning process.

Figure 2:
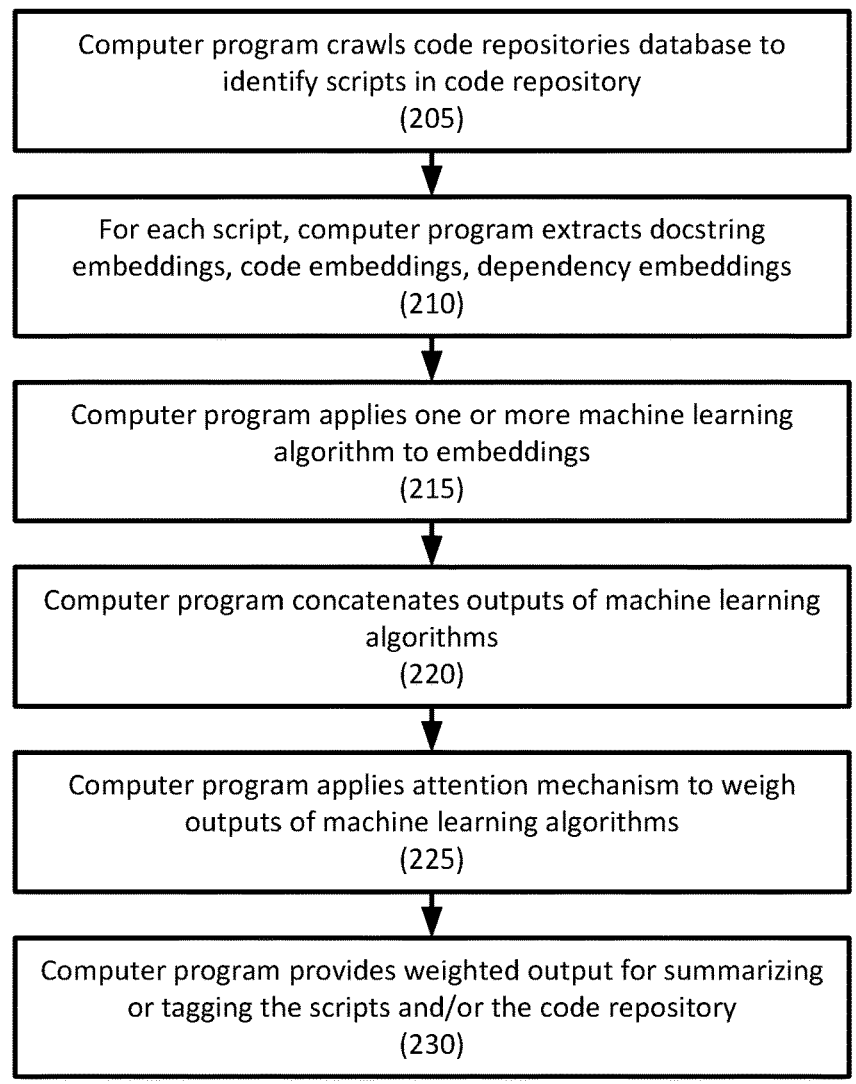
FIG. 2 depicts a method for code repository embedding for tagging and summarization using attention on multiple code domains according to an embodiment.

Referring to FIG. 2, a method for code repository embedding for tagging and summarization using attention on multiple domains is disclosed according to embodiments.

In step 205, a computer program, such as a tagging computer program, may crawl a code repositories database to identify scripts in one or more code repository.

In step 210, the computer program may extract docstring embeddings, code embeddings, and dependency embeddings from the scripts in the code repository. For example, the computer program may use standard or non-standard encoders. Example of encoders that may be used generate the embeddings include the Bi-directional Encoder Representations from Transformers (BERT).

In step 215, the computer program may apply one or more machine learning algorithm to the docstring embeddings, code embeddings, and dependency embeddings. Examples of machine learning algorithm include a gated recurrent unit (GRU) as part of a Recurrent Neural Network (RNN).

In step 220, the computer program may concatenate the outputs of the machine learning algorithms, and, in step 225, the computer program may apply one or more attention mechanism to weigh the concatenated outputs of the machine learning algorithms. The attention weights may be trained from a curated dataset collected from a labelled dataset.

The result of the application of the attention weights is a repository representation. The repository representation may be an abstract vector, such as a numerical representation of the repository.

In step 230, the computer program may provide the weighted output for downstream operations, such as summarizing, tagging, etc. the scripts or the code repositories.

For example, to tag the repository, a linear classifier may be used to classify the repository with associated tags. To summarize the repository, a neural network may be used as a summarizer that can learn to summarize based on an available repository-captions dataset.

Embodiments may provide the following technical advantages. Embodiments may generate source code embeddings for tagging and summarization, including the use of an attention mechanism, and may combine three domains of the code—docstring, full-dependency graph, and source code. Embodiments may provide scalability to large datasets and numbers of labels. Embodiments may use a crawler to introduce a larger training set to explore a new or unseen topic or captions.

Figure 3:
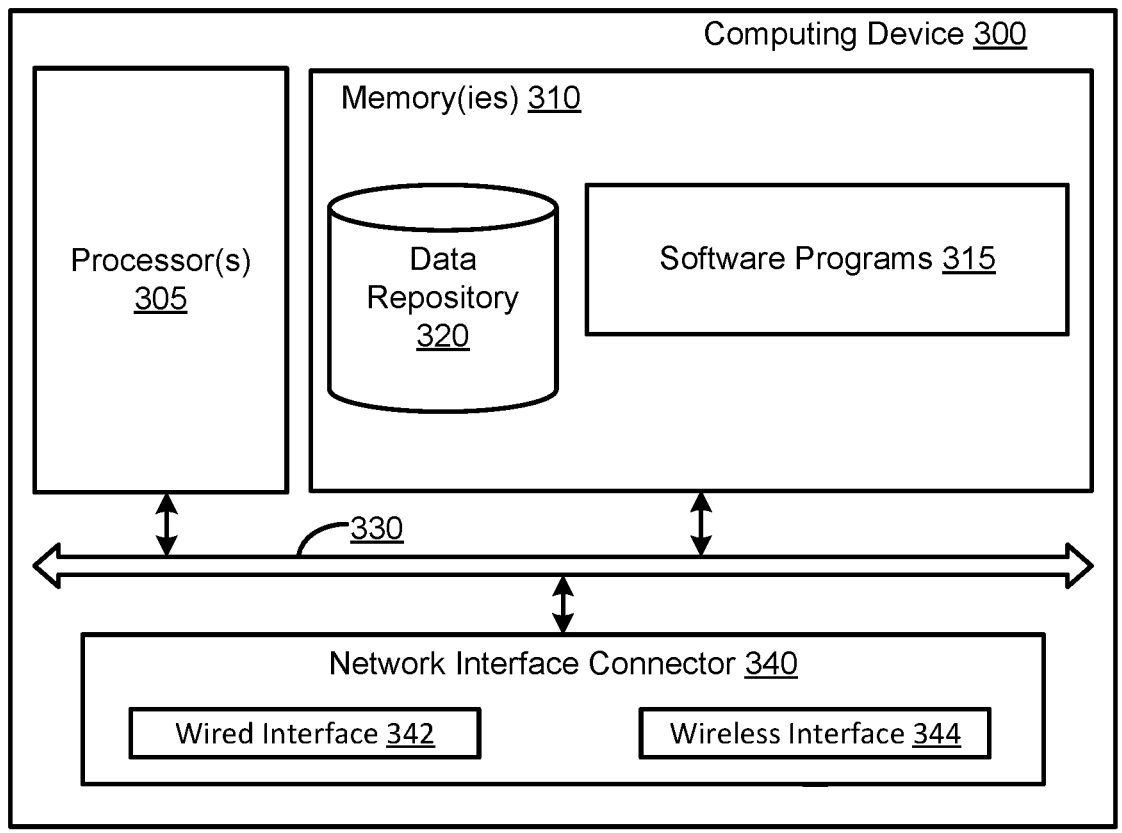
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although multiple embodiments have been described, it should be recognized that these embodiments are not exclusive to each other, and that features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for code repository embedding, comprising:
crawling, by a computer program executed by an electronic device, a code repository to identify a plurality of scripts in the code repository;
generating, by the computer program, docstring embeddings, code embeddings, and dependency embeddings from the plurality of scripts in the code repository using one or more encoders;
applying, by the computer program, a machine learning algorithm to each of the docstring embeddings, the code embeddings, and the dependency embeddings, resulting in a plurality of code repository representations;
concatenating, by the computer program, the plurality of code repository representations;
weighting, by the computer program, the plurality of code repository representations using attention weights for an attention mechanism, resulting in an abstract vector, wherein the attention weights are trained from a curated dataset collected from a labelled dataset;
tagging or summarizing, by the computer program, the code repository based on the abstract vector; and
classifying, by the computer program, the code repository representations based on the tagging or summarizing.

2. The method of claim 1, wherein the encoder comprises a Bi-directional Encoder Representations from Transformers.

3. The method of claim 1, wherein the machine learning algorithm comprises a gated recurrent unit (GRU) that is part of a Recurrent Neural Network (RNN).

4. The method of claim 1, wherein the abstract vector comprises a numerical representation of the repository.

5. A system, comprising:
an electronic device comprising:
    a computer processor; and
    a memory storing a computer program comprising instructions;
a database comprising a curated dataset of labelled data; and
a code repository database comprising a plurality of scripts;
wherein, when read and executed by the computer processor, the instructions cause the one computer processor to perform steps comprising:
    crawling the code repository database to identify a plurality of scripts in the code repository;
    generating docstring embeddings, code embeddings, and dependency embeddings from the plurality of scripts in the code repository database using one or more encoders;
    applying a machine learning algorithm to each of the docstring embeddings, the code embeddings, and the dependency embeddings, resulting in a plurality of code repository representations;

concatenating the plurality of code repository representations;

weighing the plurality of code repository representations using attention weights for an attention mechanism, resulting in an abstract vector, wherein the attention weights are trained from a curated dataset collected from a labelled dataset;

tagging or summarizing the code repository based on the abstract vector; and classifying the code repository representations based on the tagging or summarizing.

6. The system of claim 5, wherein the encoder comprises a Bi-directional Encoder Representations from Transformers.

7. The system of claim 5, wherein the machine learning algorithm comprises a gated recurrent unit (GRU) that is part of a Recurrent Neural Network (RNN).

8. The system of claim 5, wherein the abstract vector comprises a numerical representation of the repository.

9. A non-transitory computer readable storage medium, including instructions stored thereon, which when read and executed by one or more computer processors, cause the one or more computer processors to perform steps comprising:

crawling a code repository database to identify a plurality of scripts in a code repository;

generating docstring embeddings, code embeddings, and dependency embeddings from the plurality of scripts in the code repository applying a machine learning algorithm to each of the docstring embeddings, the code embeddings, and the dependency embeddings, resulting in a plurality of code repository representations;

concatenating the plurality of code repository representations;

weighting the plurality of code repository representations using attention weights for an attention mechanism, resulting in an abstract vector, wherein the attention weights are trained from a curated dataset collected from a labelled dataset;

tagging or summarizing the code repository based on the abstract vector; and classifying the code repository representations based on the tagging or summarizing.

10. The non-transitory computer readable storage medium of claim 9, wherein the machine learning algorithm comprises a gated recurrent unit (GRU) that is part of a Recurrent Neural Network (RNN).

11. The non-transitory computer readable storage medium of claim 9, wherein the abstract vector comprises a numerical representation of the repository.

* * * * *